(12) United States Patent
Kenefake et al.

(10) Patent No.: US 11,668,524 B2
(45) Date of Patent: Jun. 6, 2023

(54) METHODS FOR REMOVAL OF MOISTURE FROM LNG REFRIGERANT

(71) Applicant: ExxonMobil Upstream Research Company, Spring, TX (US)

(72) Inventors: Daryl A. Kenefake, The Woodlands, TX (US); Jeffrey Tatarzyn, Spring, TX (US); Waleed H. Ahmed, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 486 days.

(21) Appl. No.: 16/735,024

(22) Filed: Jan. 6, 2020

(65) Prior Publication Data

US 2020/0240705 A1 Jul. 30, 2020

Related U.S. Application Data

(60) Provisional application No. 62/798,720, filed on Jan. 30, 2019.

(51) Int. Cl.
*B01D 53/04* (2006.01)
*F25J 1/02* (2006.01)
(Continued)

(52) U.S. Cl.
CPC ............... *F25J 3/08* (2013.01); *B01D 53/04* (2013.01); *B01D 53/261* (2013.01);
(Continued)

(58) Field of Classification Search
CPC ............. B01D 53/04; B01D 53/261; B01D 2253/102; B01D 2253/106;
(Continued)

(56) References Cited

U.S. PATENT DOCUMENTS 1,914,337 A 6/1933 Belt
1,974,145 A 9/1934 Atwell .................. 183/120
(Continued)

FOREIGN PATENT DOCUMENTS

CN 102628635 10/2014 ............... F25J 3/08
DE 1960515 5/1971 ............... F25J 1/02
(Continued)

OTHER PUBLICATIONS

U.S. Appl. No. 15/347,968, filed Nov. 10, 2016, Pierre, Fritz Jr. et al.
(Continued)

*Primary Examiner* — Frank M Lawrence, Jr.
(74) *Attorney, Agent, or Firm* — ExxonMobil Upstream Research Company—Law Department

(57) ABSTRACT

Methods and systems for removing moisture from a refrigerant can utilize a desiccant-based system. The methods and systems can be employed in conjunction with a liquid natural gas (LNG) refrigeration circuit in either an online mode or an offline mode. For example, a system for removing moisture from a refrigerant can include: a refrigerant source; a moisture removal unit containing desiccant; and a refrigeration circuit comprising a refrigerant compressor, a refrigerant condenser, and a heat exchanger that are fluidly connected in a loop, wherein the refrigerant source is fluidly coupled to the moisture removal unit to supply a refrigerant from the refrigerant source to the moisture removal unit, and the moisture removal unit is fluidly coupled to the refrigeration circuit to supply the refrigerant from the moisture removal unit to the refrigeration circuit.

20 Claims, 2 Drawing Sheets

(51) Int. Cl.
*F25J 3/08* (2006.01)
*B01D 53/26* (2006.01)

(52) U.S. Cl.
CPC .. *B01D 2253/102* (2013.01); *B01D 2253/106* (2013.01); *B01D 2253/112* (2013.01); *B01D 2253/116* (2013.01); *B01D 2256/24* (2013.01); *B01D 2256/245* (2013.01); *B01D 2257/80* (2013.01); *F25J 1/0211* (2013.01); *F25J 2205/60* (2013.01); *F25J 2220/68* (2013.01)

(58) Field of Classification Search
CPC ........ B01D 2253/112; B01D 2253/116; B01D 2256/10; B01D 2256/24; B01D 2256/245; B01D 2257/80; F25B 45/00; F25B 2345/001; F25J 1/0022; F25J 1/0052; F25J 1/0211; F25J 1/025; F25J 3/08; F25J 2205/60; F25J 2220/68
USPC ................ 95/117; 96/108; 34/80, 472, 473; 62/600, 606, 611, 613, 614
See application file for complete search history.

(56) References Cited

U.S. PATENT DOCUMENTS

| | | | |
|---|---|---|---|
| 2,007,271 A | 7/1935 | Frankl | 62/175.5 |
| 2,011,550 A | 8/1935 | Hasche | 62/121 |
| 2,321,262 A | 6/1943 | Taylor | 62/140 |
| 2,475,255 A | 7/1949 | Rollman | 62/170 |
| 2,537,045 A | 1/1951 | Garbo | 62/122 |
| 3,014,082 A | 12/1961 | Woertz | 260/676 |
| 3,103,427 A | 9/1963 | Jennings | 62/39 |
| 3,180,709 A | 4/1965 | Yendall et al. | 23/210 |
| 3,347,055 A | 10/1967 | Blanchard et al. | 62/9 |
| 3,370,435 A | 2/1968 | Arregger | 62/28 |
| 3,400,512 A | 9/1968 | McKay | 55/69 |
| 3,400,547 A | 9/1968 | Williams et al. | 62/55 |
| 3,511,058 A | 5/1970 | Becker | 62/9 |
| 3,724,226 A | 4/1973 | Pachaly | 62/39 |
| 3,878,689 A | 4/1975 | Grenci | 62/9 |
| 3,894,856 A * | 7/1975 | Lofredo | F25J 1/0265 95/115 |
| 4,065,278 A * | 12/1977 | Newton | F25J 1/0035 62/622 |
| 4,227,901 A * | 10/1980 | Lange | B01D 15/00 96/136 |
| 4,281,518 A | 8/1981 | Muller et al. | 62/12 |
| 4,415,345 A | 11/1983 | Swallow | 62/28 |
| 4,609,388 A | 9/1986 | Adler et al. | 62/12 |
| 4,769,054 A | 9/1988 | Steigman | 62/12 |
| 4,901,533 A * | 2/1990 | Fan | F25J 1/0244 62/614 |
| 5,025,860 A | 6/1991 | Mandrin | 166/267 |
| 5,137,558 A | 8/1992 | Agrawal | 62/24 |
| 5,139,547 A | 8/1992 | Agrawal et al. | 62/8 |
| 5,141,543 A | 8/1992 | Agrawal et al. | 62/8 |
| 5,240,483 A * | 8/1993 | Rosen | F25B 43/003 96/417 |
| 5,638,698 A | 6/1997 | Knight et al. | 62/632 |
| 5,950,453 A | 9/1999 | Bowen et al. | 62/612 |
| 6,003,603 A | 12/1999 | Breivik et al. | 166/357 |
| 6,158,242 A | 12/2000 | Lu | 62/637 |
| 6,295,838 B1 | 10/2001 | Shah et al. | 62/643 |
| 6,298,688 B1 | 10/2001 | Brostow et al. | 62/613 |
| 6,308,531 B1 | 10/2001 | Roberts et al. | |
| 6,412,302 B1 | 7/2002 | Foglietta | 62/611 |
| 6,662,589 B1 | 12/2003 | Roberts et al. | 62/425 |
| 6,889,522 B2 | 5/2005 | Prible et al. | 62/612 |
| 7,143,606 B2 | 12/2006 | Trainer | 62/611 |
| 7,278,281 B2 | 10/2007 | Yang et al. | 62/612 |
| 7,386,996 B2 | 6/2008 | Fredheim et al. | 62/612 |
| 7,520,143 B2 | 4/2009 | Spilsbury | 62/620 |
| 7,712,331 B2 | 5/2010 | Dee et al. | 62/612 |
| 8,079,321 B2 | 12/2011 | Balasubramanian | 114/74 |
| 8,435,403 B2 | 5/2013 | Sapper et al. | 208/254 |
| 8,464,289 B2 | 6/2013 | Pan | 725/34 |
| 8,601,833 B2 | 12/2013 | Dee et al. | 62/648 |
| 8,616,012 B2 | 12/2013 | Duerr et al. | 62/89 |
| 8,616,021 B2 | 12/2013 | Minta | |
| 8,747,520 B2 | 6/2014 | Bearden et al. | 95/41 |
| 9,016,088 B2 | 4/2015 | Butts | 62/613 |
| 9,339,752 B2 | 5/2016 | Reddy et al. | B01D 53/002 |
| 9,435,229 B2 | 9/2016 | Alekseev et al. | 60/643 |
| 9,439,077 B2 | 9/2016 | Gupta et al. | H04W 12/12 |
| 9,459,042 B2 | 10/2016 | Chantant et al. | 62/50.2 |
| 2002/0189265 A1* | 12/2002 | Ferris | C09K 3/12 62/77 |
| 2006/0000615 A1 | 1/2006 | Choi | 166/352 |
| 2007/0277674 A1 | 12/2007 | Hirano et al. | 95/290 |
| 2009/0217701 A1 | 9/2009 | Minta et al. | 62/612 |
| 2010/0192626 A1 | 8/2010 | Chantant | 62/606 |
| 2010/0251763 A1 | 10/2010 | Audun | 62/614 |
| 2011/0036121 A1 | 2/2011 | Roberts et al. | 62/612 |
| 2011/0126451 A1 | 6/2011 | Pan et al. | 44/451 |
| 2011/0259044 A1 | 10/2011 | Baudat et al. | 62/611 |
| 2012/0042689 A1* | 2/2012 | Bresler | C10L 3/106 95/114 |
| 2012/0285196 A1 | 11/2012 | Flinn et al. | 62/620 |
| 2013/0074541 A1 | 3/2013 | Kaminsky et al. | 62/601 |
| 2013/0199238 A1 | 8/2013 | Mock et al. | 62/611 |
| 2014/0130542 A1 | 5/2014 | Brown et al. | 62/612 |
| 2015/0285553 A1 | 10/2015 | Oelfke et al. | 62/611 |
| 2015/0343417 A1* | 12/2015 | Puranik | B01J 20/3259 502/64 |
| 2017/0010041 A1 | 1/2017 | Pierre, Jr. et al. | 62/616 |
| 2017/0016667 A1 | 1/2017 | Huntington et al. | 62/614 |
| 2017/0016668 A1 | 1/2017 | Pierre, Jr. et al. | 62/614 |
| 2020/0240687 A1* | 7/2020 | Kenefake | F25J 1/0022 |

FOREIGN PATENT DOCUMENTS

| | | | |
|---|---|---|---|
| DE | 2354726 | 5/1975 | ............ F17C 9/04 |
| DE | 3149847 | 7/1983 | ............ B01D 5/00 |
| DE | 19906602 | 8/2000 | ............ F25J 3/08 |
| DE | 102013007208 | 10/2014 | ............ B01D 3/14 |
| EP | 1715267 | 10/2006 | ............ F25J 3/02 |
| EP | 1972875 | 9/2008 | ............ F25J 3/04 |
| EP | 2157013 | 8/2009 | ............ F17C 3/02 |
| EP | 2629035 | 8/2013 | ............ F25J 1/00 |
| FR | 2756368 | 5/1998 | ............ B01D 53/26 |
| GB | 1376678 | 12/1974 | ............ F25J 1/02 |
| GB | 1596330 | 8/1981 | ............ F25J 1/02 |
| GB | 2172388 | 9/1986 | ............ E21B 43/16 |
| GB | 2333148 | 7/1999 | ............ F25J 1/02 |
| GB | 2470062 | 11/2010 | ............ F25J 1/02 |
| GB | 2486036 | 11/2012 | ............ F25J 1/02 |
| JP | 59216785 | 12/1984 | ............ F25J 1/02 |
| JP | 2530859 | 4/1997 | ............ G02F 1/13 |
| JP | 5705271 | 11/2013 | ............ F25J 3/00 |
| JP | 5518531 | 6/2014 | ............ Y02P 20/152 |
| KR | 2010/0112708 | 10/2010 | ............ F17C 5/00 |
| KR | 2011/0079949 | 7/2011 | ............ F25J 3/02 |
| WO | WO2006/120127 | 11/2006 | ............ F25J 3/02 |
| WO | WO2008/133785 | 11/2008 | ............ B63B 25/08 |
| WO | WO2011/101461 | 8/2011 | ............ B63B 25/16 |
| WO | WO2012/031782 | 3/2012 | ............ F25J 1/02 |
| WO | WO2014/048845 | 4/2014 | ............ F25J 1/00 |
| WO | WO2015/110443 | 7/2015 | ............ F25J 1/00 |
| WO | WO2017/011123 | 1/2017 | ............ F25J 3/08 |
| WO | WO2017/067871 | 4/2017 | ............ F01D 15/10 |

OTHER PUBLICATIONS

U.S. Appl. No. 15/347,983, filed Nov. 10, 2016, Pierre, Fritz Jr. et al.
U.S. Appl. No. 15/348,004, filed Nov. 10, 2016, Pierre, Fritz Jr. et al.
U.S. Appl. No. 15/348,533, filed Nov. 10, 2016, Pierre, Fritz Jr.
U.S. Appl. No. 62/458,127, filed Feb. 13, 2017, Pierre, Fritz Jr.
U.S. Appl. No. 62/458,131, filed Feb. 13, 2017, Pierre, Fritz Jr.
U.S. Appl. No. 62/463,274, filed Feb. 24, 2017, Kaminsky, Robert D. et al.

(56) References Cited

OTHER PUBLICATIONS

U.S. Appl. No. 62/478,961, Balasubramanian, Sathish.

Bach, Wilfried (1990) "Offshore Natural Gas Liquefaction with Nitrogen Cooling—Process Design and Comparison of Coil-Wound and Plate-Fin Heat Exchangers," *Science and Technology Reports*, No. 64, Jan. 1, 1990, pp. 31-37.

Chang, Ho-Myung et al., (2019) "Thermodynamic Design of Methane Liquefaction System Based on Reversed-Brayton Cycle" Cryogenics, pp. 226-234.

ConocoPhillips Liquefied Natural Gas Licensing (2017) "Our Technology And Expertise Are Ready To Work Toward Your LNG Future Today," http://lnglicensing.conocopbillips.com/Documents/15-1106%20LNG%20Brochure_March2016.pdf, Apr. 25, 2017, 5 pgs.

Danish Technologies Institute (2017) "Project—Ice Bank System with Pulsating and Flexible Heat Exchanger (IPFLEX)," https://www.dti.dk/proiects/project-ice-bank-systetn-with-pulsating-andflexible-heat-exchanger-ipflex/37176.

Diocee, T. S. et al. (2004) "Atlantic LNG Train 4—The Worlds Largest LNG Train", *The 14th International Conference and Exhibition on Liquefied Natural Gas (LNG 14)*, Doha, Qatar, Mar. 21-24, 2004, 15 pgs.

Khoo, C. T. et al. (2009) "Execution of LNG Mega Trains—The Qatargas 2 Experience," *WCG*, 2009, 8 pages.

Laforte, C. et al. (2009) "Tensile, Torsional and Bending Strain at the Adhesive Rupture of an Iced Substrate," *ASME 28th Int'l Conf. on Ocean, Offshore and Arctic Eng.*, OMAE2009-79458, 8 pgs.

McLachlan, Greg (2002) "Efficient Operation of LNG From The Oman LNG Project," *Shell Global Solutions International B.V.*, Jan. 1, 2002, pp. 1-8.

Olsen, Lars et al. (2017).

Ott, C. M. et al. (2015) "Large LNG Trains: Technology Advances to Address Market Challenges", *Gastech*, Singapore, Oct. 27-30, 2015, 10 pgs.

Publication No. 43031 (2000) Research Disclosure, Mason Publications, Hampshire, GB, Feb. 1, 2000, p. 239, XP000969014, ISSN: 0374-4353, paragraphs [0004], [0005] & [0006].

Publication No. 37752 (1995) Research Disclosure, Mason Publications, Hampshire, GB, Sep. 1, 1995, p. 632, XP000536225, ISSN: 0374-4353, 1 page.

Ramshaw, Ian et al. (2009) "The Layout Challenges of Large Scale Floating LNG," *ConocoPhillips Global LNG Collaboration*, 2009, 24 pgs, XP009144486.

Riordan, Frank (1986) "A Deformable Heat Exchanger Separated by a Helicoid," *Journal of Physics A: Mathematical and General*, v. 19.9, pp. 1505-1515.

Roberts, M. J. et al. (2004) "Reducing LNG Capital Cost in Today's Competitive Environment", PS2-6, *The 14th International Conference and Exhibition on Liquefied Natural Gas (LNG 14)*, Doha, Qatar, Mar. 21-24, 2004, 12 pgs.

Shah, Pankaj et al. (2013) "Refrigeration Compressor Driver Selection and Technology Qualification Enhances Value for the Wheatstone Project," *17th Int'l Conf. & Exh. On LNG*, 27 pgs.

Tan, Hongbo et al. (2016) "Proposal and Design of a Natural Gas Liquefaction Process Recovering the Energy Obtained from the Pressure Reducing Stations of High-Pressure Pipelines," *Cryogenics*, Elsevier, Kidlington, GB, v.80, Sep. 22, 2016, pp. 82-90.

Tianbiao, He et al. (2015), Optimal Synthesis of Expansion Liquefaction Cycle for Distributed-Scale LNG, *Institute of Refrigeration and Cryogenics, Shanghai Jiao Tong University*, pp. 268-280.

Tsang, T. P. et al. (2009) "Application of Novel Compressor/Driver Configuration in the Optimized Cascade Process," *2009 Spring Mtg. and Global Conf. on Process Safety—9th Topical Conf. on Gas Utilization*, 2009, Abstract, 1 pg. https://www.aiche.org/conferences/aiche-spring-meeting-atid-globalcongress- on-process-safety/2009/proceeding/paper/7a-application-novel-compressordriver-configurationoptimized-cascader-process.

\* cited by examiner

METHODS FOR REMOVAL OF MOISTURE FROM LNG REFRIGERANT

CROSS REFERENCE TO RELATED APPLICATIONS

This application claims the priority benefit of U.S. Provisional Patent Application No. 62/798,720, filed Jan. 30, 2019, entitled METHODS FOR REMOVAL OF MOISTURE FROM LNG REFRIGERANT.

BACKGROUND

The present disclosure relates to preventing water accumulation in a cryogenic refrigeration circuit. Processing of cryogenic hydrocarbon liquids, such as liquefied natural gas (LNG), conventionally utilizes refrigeration to cool inlet gasses to a required liquefaction temperature (e.g., methane is cooled to make LNG). Refrigerant gasses used in refrigeration circuits are either single component (e.g. methane, nitrogen, propane, ethylene, and the like) or are mixed refrigerants. Mixed refrigerants are mixtures that may include, but are not limited to, methane, nitrogen, ethane, ethylene, propane, and other commercial refrigerant compounds. Refrigeration circuits are initially charged with refrigerant and due to some loss during process runs, additional refrigerant material may be added periodically to make up the required volume. Neither the initial refrigerant nor make-up refrigerant are typically completely devoid of water, thus small amounts of water often find a way into the refrigeration circuit. At places where the system is below the freezing point of water (e.g., within the tubes of the heat exchangers), this water may form a solid film. When heat exchangers are taken out of service and warmed up (e.g., for planned maintenance, unplanned downtime, etc.), this distributed solid film melts and forms pools of liquid water in these heat exchangers. Upon re-cooling the heat exchanger to return to operating conditions, the water may freeze, which can damage the heat exchangers and decrease efficiency in the production of LNG. Therefore, it is common practice to remove the liquid water from the refrigeration circuit before re-cooling.

As a standard of practice in the industry today, water is typically removed from the refrigeration circuit by "de-frosting." In de-frosting, refrigerant is fully de-inventoried from the refrigeration circuit and disposed of (e.g., burned). Dry gasses are then passed through all refrigeration circuit conduits (piping/tubing), valves, and heat exchangers to warm up the refrigeration circuit components and vaporize any accumulated water. This water is swept away by the dry gas stream and burned in the facility flare. This procedure is time intensive, requires a substantial amount of off-line time, is costly, and is wasteful. A more efficient method for removing moisture from a refrigeration circuit is thus needed.

SUMMARY OF THE INVENTION

The present disclosure relates to preventing water accumulation in the refrigeration circuit of a liquefied natural gas (LNG) plant through refrigerant moisture removal.

In one aspect, the present invention provides a system for removing moisture from refrigerant for use in a liquefied natural gas (LNG) refrigeration circuit that includes a refrigerant source coupled to a moisture removal unit containing desiccant. The moisture removal unit may be fluidly coupled to refrigeration circuit, which may include components such as, but not limited to, a refrigerant compressor, a refrigerant condenser, and a heat exchanger. The compressor, condenser, and heat exchanger may be fluidly connected in a loop such that the refrigerant compressor is upstream of the refrigerant condenser, the refrigerant condenser is upstream of the heat exchanger, and the heat exchanger is upstream of the refrigerant compressor.

In another aspect, the present invention provides a method for supplying dehydrated refrigerant to a LNG refrigeration circuit which may include the steps of:
 a. providing refrigerant in a refrigerant source;
 b. fluidly connecting the refrigerant source upstream from a moisture removal unit containing a desiccant; and
 c. fluidly connecting the moisture removal unit upstream of the refrigeration circuit; and
 d. conveying refrigerant from the refrigerant source through the moisture removal unit to the refrigeration circuit.

The refrigerant may be conveyed from the refrigerant source through the moisture removal unit to the refrigeration circuit while the refrigeration circuit is warmed (e.g., at ambient temperature) or cooled (e.g., cryogenic temperatures).

In another aspect, the present invention provides a method of cryogenically processing liquid natural gas that includes the steps of:
 a. providing a gas stream;
 b. providing a refrigerant;
 c. conveying the refrigerant through a moisture removal unit to form a dehydrated refrigerant;
 d. compressing the dehydrated refrigerant to provide a compressed dehydrated refrigerant;
 e. cooling and condensing the compressed dehydrated refrigerant to provide a cooled refrigerant;
 f. conveying the cooled dehydrated refrigerant through a heat exchanger; and
 g. passing the gas stream through the heat exchanger to cool at least part of the gas stream by indirect heat exchange with the dehydrated cooled refrigerant.

The gas stream may be, for example, 87 percent by mole to 97 percent by mole methane.

In any embodiment, the moisture removal unit may be fluidly coupled to the refrigeration circuit, for example, downstream of the heat exchanger. In any embodiment, the moisture removal unit may be a permanent fixture in the system or may be removably attached to the refrigeration circuit. In any embodiment, the refrigerant may be single component or mixed refrigerant. Suitable mixed refrigerants include, but are not limited to, mixtures of two or more of methane, nitrogen, ethane, ethylene, and propane. Suitable single refrigerants include, but are not limited to, methane, nitrogen, propane, and ethylene.

In any embodiment, the moisture removal unit may include desiccant to remove moisture from the refrigerant. Examples of suitable desiccants include, but are not limited to, silica, activated charcoal, calcium sulfate (gypsum), calcium chloride, molecular sieves, and combinations thereof.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combi

DETAILED DESCRIPTION

Figure 1:
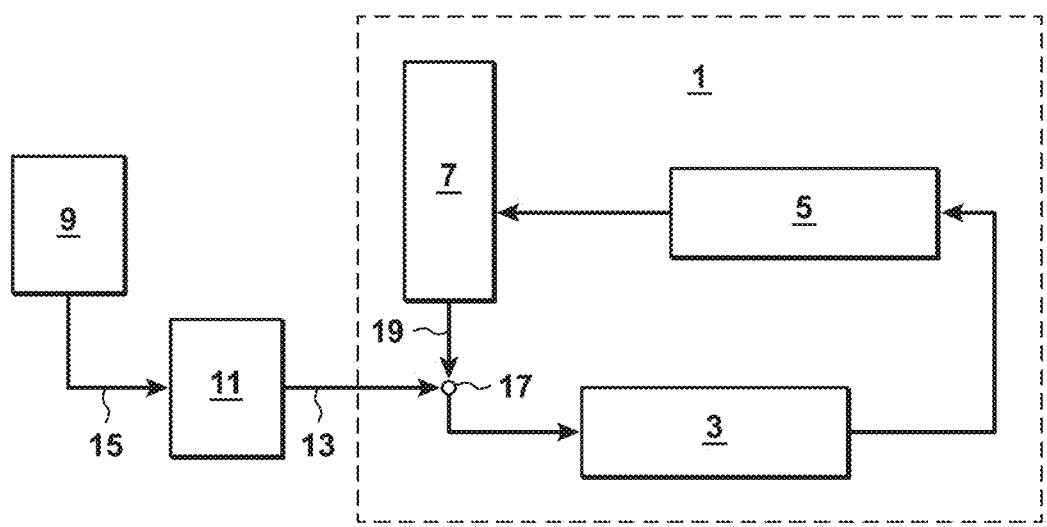
- FIG. 1 illustrates a nonlimiting example of a refrigeration circuit incorporating a moisture removal unit downstream of a refrigerant source to remove moisture from refrigerant feeding into a refrigeration circuit.

The present invention now will be described more fully hereinafter, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present disclosure provides systems and methods for removing moisture or water from refrigerant in a refrigeration circuit without de-inventorying refrigerant or using large volumes of drying gas.

As used herein, de-inventorying and grammatical variations thereof refer to a process where refrigerant is removed from refrigeration circuit and disposed of or stored elsewhere. Conversely, inventorying and grammatical variations thereof refer to a process where a refrigeration circuit is initially substantially void of refrigerant and a volume of refrigerant is added to the circuit sufficient to allow operation of the refrigeration circuit. This may be upon initial use of the refrigeration circuit or after de-inventorying of the refrigeration circuit, for example, to perform repairs.

The methods disclosed herein provide methods for removing water from a refrigeration circuit that are not currently or have been previously used in the LNG industry. These methods expand the use of existing equipment and utilize additional equipment, such as, for example, new piping connections and procedures.

Advantageously, since methods disclosed herein do not require de-inventorying of the refrigerant from the refrigeration circuit and may not require warming of the refrigeration circuit, cost savings may be realized both by reducing time spent offline and extending the lifetime of refrigerant (and avoiding the purchase of new refrigerant).

As used herein, a "refrigeration circuit" includes the system through which refrigerant is cycled to allow a cooled refrigerant to absorb energy from a gas stream (e.g., natural gas). The refrigeration circuit may be part of an industrial system, for example, in the cryogenic processing of gasses to liquid form (e.g., in a liquid natural gas train). Refrigeration circuits may have multiple components, including, but not limited to, refrigerant compressor, refrigerant condenser, heat exchanger, evaporators, or any combination thereof.

Generally, refrigeration circuits have a directional flow when in use. For example, in refrigeration circuits disclosed herein, a compressor may compress refrigerant into a high-pressure gas by a compressor after which the gas is conveyed to a condenser to liquefy and cool the refrigerant. The cooled, liquid refrigerant is then conveyed to the heat exchanger where energy from the gas stream (e.g., natural gas) may be absorbed by the refrigerant, cooling and liquefying the gas stream. This disclosure considers these components and steps in this order, and uses the terms "downstream" and "upstream" to indicate fluid flow direction as when the system is in functional use (e.g., cooling). As used herein, the term "downstream" is used to indicate that it is in the direction of refrigerant flow. "Upstream" is used to indicate that it is in the direction opposite of refrigerant flow. In addition to the components listed above, refrigeration circuits often also include a conduit that feeds into the refrigeration source to add refrigerant into the system as needed to make up for any loss of refrigerant during use.

As used herein, the term "cryogenic" is intended to mean a liquid, gas, or mixed phase fluid having a temperature less than $-70°$ C. Examples of cryogens include liquid nitrogen (LIN), liquefied natural gas (LNG), liquid helium, liquid carbon dioxide, and pressurized, mixed-phase cryogens (e.g., a mixture of LIN and gaseous nitrogen). As used herein, the term "cryogenic temperature" is intended to mean a temperature below $-70°$ C.

As used herein, "refrigerant source" broadly means any source of refrigerant that can be fluidly connected to a refrigeration circuit. In single refrigerant systems, the source may contain a single refrigerant. In multiple refrigerant systems, the source may contain pre-mixed refrigerant or may be a combination of sources, each source containing each component in the mixed refrigerant. Refrigerant in the refrigerant source may be stored in a suitable container, for example, a tank. The tank may have one or more access ports for fluidly connecting the tank to a moisture removal unit. Transportation, handling, and storage of refrigerants are regulated under government agencies such as the EPA and OSHA. One of skill in the art will be familiar with these guidelines.

As used herein, the term "compressor" broadly means any device or series of devices capable of compressing refrigerant into a high-pressure gas. Although the singular form of compressor is used herein, it is contemplated as within the scope of the invention that "compressor" includes any system, including those that may have multiple components, that compress refrigerant into a high-pressure gas. One of skill in the art will be familiar with a variety of suitable compressor systems, including, but not limited to, mechanical, low speed, high speed, and centrifugal.

As used herein, the term "condenser" broadly means any device or series of devices capable of condensing a high-pressure refrigerant into liquid form. Although referred, the singular form of condenser is used herein, it is contemplated as within the scope of the invention that "condenser" includes any system, including those that may have multiple components, which condense high-pressure refrigerant into a cooled liquid. One of skill in the art will be familiar with a variety of suitable condenser systems.

As used herein, the term "heat exchanger" broadly means any device or devices capable of transferring heat from one media to another media, including particularly any structure, e.g., device commonly referred to as a heat exchanger. Although referred, the singular form of heat exchanger is used herein, it is contemplated as within the scope of the invention that "heat exchanger" includes any system, including those that may have multiple components, which enable transfer of energy from one source (e.g., natural gas stream) to the refrigerant. One of skill in the art will be familiar with suitable heat exchangers. For example, in LNG applications, coil wound heat exchangers and brazed aluminum heat exchangers are typically employed.

The present disclosure incorporates a moisture removal unit or access to a moisture removal unit downstream of a refrigerant source upstream of the refrigeration circuit into which it feeds. As used herein, "moisture removal unit" refers to a component or series of components that can remove moisture from refrigerant and has an inlet conduit connecting the moisture removal unit to the refrigeration circuit and an outlet conduit, which feeds back into the refrigeration circuit. Although the singular form of moisture removal unit is used herein, it is contemplated as within the scope of the invention that "moisture removal unit" includes any system, including those that may have multiple components, that removal of moisture from the refrigerant.

Optionally, a moisture analysis unit capable of monitoring the moisture content of the refrigerant may be included in the conduits connecting the moisture removal unit to the refrigeration circuit or within the refrigeration circuit itself. The moisture analysis unit and required conduits may be incorporated in series (where the entire refrigerant stream is conveyed to the moisture analysis unit) or in parallel (e.g., where only a portion of the refrigerant stream is conveyed to the moisture analysis unit).

One of skill in the art will be familiar with common methods for measuring the moisture content of refrigerant. For example, the moisture analysis unit may measure the water dew point of the refrigerant. As used herein, the water dew point is the temperature (at a particular pressure) at which condensate begins to form. Water dew point may be measured manually or automatically. One of skill in the art will recognize methods suitable for measuring water dew point of refrigerant. For example, in an automatic system, a sample of refrigerant may be conveyed over a chilled mirror on which the formation of condensate is detectable by a change in the light reflecting off the mirror.

Conduits connecting the moisture removal unit to other components within the refrigeration circuit may also include valves/valve bodies. The moisture removal methods and equipment disclosed herein may be used in any type of refrigeration circuit, including, but not limited to, those well known in the art such as the cascade cycle, the mixed refrigerant cycle, the gas-expander cycle, or any combination thereof.

The refrigeration circuit may also contain piping, tubing, valves, valve bodies, and the like for connecting and directing flow from one component to another. As used herein, these components are collectively called "conduits." As used herein, a "conduit" forms an enclosed passageway through which refrigerant flows or can flow and can be or include one or more sections of tubing or pipe, one or more passageways through one or more other components such as fittings, valve bodies, accumulators, or a combination thereof, as examples. Further, conduits described herein as "connecting" two components provide an enclosed passageway between the two components through which refrigerant flows or can flow, at least in one or more modes of operation. Moreover, refrigerant conduits described herein may differ in shape or length from what is shown on the drawings, which are not drawn to scale.

The term "refrigerant," as used herein, refers to refrigerant in a liquid, vapor, or gas form, or any combination thereof. Refrigerant may be a single gas component or a mixture of gas components ("mixed refrigerant" or "MR"). Examples of suitable refrigerants include those well known in the art, for example, methane, ethane, propane, ethylene, nitrogen, and any combination or mixture thereof. Refrigerants may also contain impurities, moisture, or both.

As used herein, the terms "moisture" and "water" are synonymous with each other and used interchangeably. As used herein, "dehydrated" refers to refrigerant that has at least a portion of water removed when compared to its state in the refrigerant source. The amount of water within the refrigerant may be indicated by the refrigerant's water dew point. The relationship of water dew point to the saturation or percent of water the refrigerant depends on the pressure of the refrigerant, but one of skill in the art can easily convert dew point to a percent measurement based on a well-known and easily determined relationship. Thus, the refrigerant exiting the moisture removal system may have between about 98% to about 100% of water removed, which includes about 98% to about 99%, about 98.5% to about 99%, about 99 to about 99.5%, about 99% to about 100%, and about 99.5% to about 100%. As used herein, 100% removal of water means that the refrigerant may have no detectable level of water. In any embodiment, the methods herein may be able to remove moisture from circulating refrigerant sufficiently such that there is no detectable level of water in the refrigerant.

FIG. 1 shows a moisture removal unit 11 connected to a refrigeration circuit 1. FIG. 1 is a general illustration and other components can be included in the refrigeration circuit 1 to ensure the proper and safe operation of the refrigeration circuit 1. A moisture removal unit 11 is connected to the refrigeration circuit 1 by a conduit 13. FIG. 1 also depicts a refrigeration source 9 connected a moisture removal unit 11 via a conduit 15, which feeds into refrigeration circuit 1 by way of conduit 13. When needed, refrigerant will be conveyed from the refrigerant source 9 through the conduit 15 to the moisture removal unit 11, then into the refrigeration circuit 1 by way of the conduit 13. The refrigeration circuit 1 includes a compressor 3, a condenser 5, and a heat exchanger 7. Additional components can include, but are not limited to, distributors, filters, valves, pressure meters, sensors, and the like, and combinations thereof. As used herein, when a figure depicts a solid line connecting two components (including solid lines having arrowheads), the line is used as a general term to encompass the line or lines that fluidly connect the two components and the other hardware like pumps, connectors, piping/tubing, and valves that may be installed along the line. As used herein, arrowheads depict the direction of refrigerant flow when the refrigeration circuit is in use for cryogenic processing (e.g., cooling). The refrigeration circuit 1 in FIG. 1 conveys refrigerant from a compressor 3 to a condenser 5 and from the condenser 5 to a heat exchanger 7.

The refrigeration circuit 1 may have a valve 17 that controls refrigerant flow direction, volume, or both. To allow refrigerant originating from the conduit 13 to be fed into the refrigeration circuit 1, the valve 17 may be manipulated to stop or slow flow originating from the conduit 19 so that the refrigerant originating from conduit 13 may enter the refrigeration circuit 1. When enough refrigerant has been added, the valve 17 may be manipulated to stop flow originating from the conduit 13 and initiate flow originating from the conduit 19. The configuration of the refrigeration circuit 1 shown in FIG. 1 may be a useful configuration for adding make-up refrigerant during normal operating of the refrigerant cycle without warming as well as for initial inventorying of the refrigerant circuit when the system is warm. As used herein, "warmed" and grammatical variations thereof, refers to the refrigeration circuit where the temperature of the refrigerant downstream of the condenser and upstream of the heat exchanger is greater than the temperature of the refrigerant at that location as it would be during operational LNG production.

While FIG. 1 shows the refrigerant source 9 feeding into the refrigeration circuit 1 downstream of the heat exchanger 7 and upstream of the compressor 3 by way of the conduit 13. When using the conduit 13 to feed refrigerant in for initial inventorying of the circuit, the conduit 13 may feed into the refrigeration circuit 1 at any place, for example, downstream of the compressor 3 and upstream of the condenser 5. Conduit 13 may also feed into the refrigeration circuit 1 downstream of the condenser 5 and upstream of the heat exchanger 7. These alternative configurations may be used when the circuit is warmed and offline, but is not suitable for adding make up volumes of refrigerant during operational use unless the refrigerant is fed into the system as a compressed (if fed in upstream of the condenser) or condensed (if fed in upstream of the heat exchanger) gas. In such embodiments, the conduit 13 feeding into the refrigeration circuit 1 may have a compressor, condenser, or both between the refrigerant source 9 and the refrigeration circuit 1.

The present disclosure further provides a method for preventing water accumulation in a refrigeration circuit. One method by which water may be prevented from accumulating in a refrigeration circuit includes the step of treating refrigerant to remove moisture prior to its entry into the refrigeration circuit. This may be accomplished by conveying refrigerant from a refrigerant source to a moisture removal unit and then to the refrigeration circuit.

For example, using a system such as shown in FIG. 1, refrigerant may be conveyed from the refrigerant source 9 through conduit 15, through the moisture removal unit 11 and to the refrigeration circuit 1 through conduit 13. The valve 17 may be manipulated to stop or to slow the flow of refrigerant originating from conduit 19 so that the refrigeration circuit 1 may accommodate the increased refrigerant volume. After a desired amount of refrigerant has been added, the valve 17 may be manipulated to stop flow originating from the conduit 13 and allow full flow originating from conduit 19 to resume. Optionally, these steps may be preceded by warming up of the refrigeration circuit 1, for example, upon initial inventorying of the circuit 1 or after taking the refrigeration circuit offline and de-inventorying refrigerant, for example, for repairs. In such instances, the refrigeration circuit may be warmed (e.g., to ambient temperature). As used herein, ambient temperature refers to the temperature of the air surrounding the refrigerant circuit and the temperature to which the circuit would equilibrate when taken offline.

As discussed above, the methods and systems disclosed herein may be used when refrigerant is initially inventoried to the refrigeration circuit, when refrigerant is added to a refrigerant circuit to make up for refrigerant volume lost during use, or in both circumstances. Refrigerant gas may be fed into the refrigeration circuit at a location where the refrigerant being added is at the same temperature and pressure at the location in the refrigeration circuit at which it is being added. For example, if the refrigerant is fed into the refrigeration circuit at low pressure and ambient temperature, it may enter the refrigeration circuit upstream of the compressor while the refrigeration circuit is online or, if taken offline and warmed, refrigerant may enter at any location. In a particularly useful configuration, refrigerant is added to the refrigeration circuit as pictured in FIG. 1.

Figure 2:
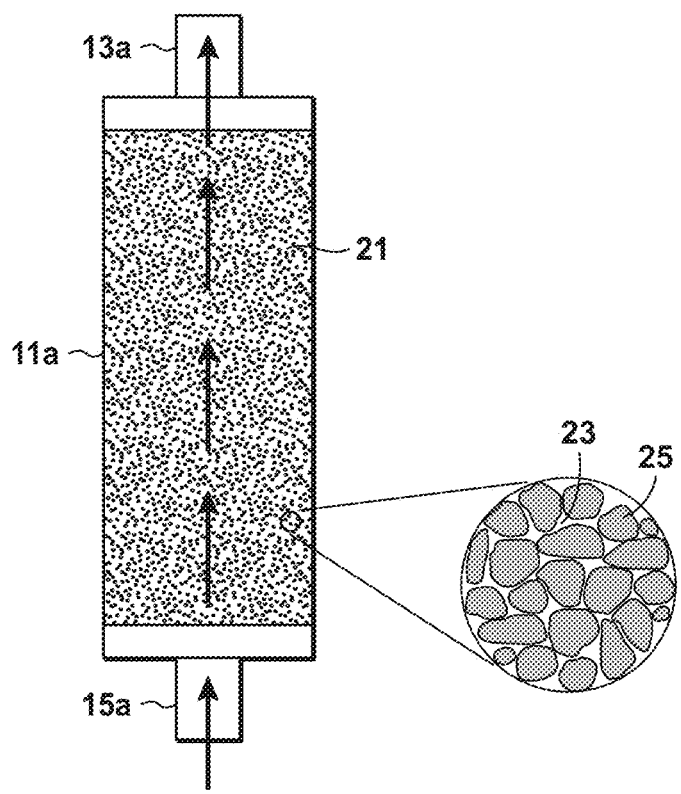
FIG. 2 illustrates a nonlimiting example of a moisture removal unit wherein a refrigerant stream is conveyed through a bed of desiccant.

The moisture removal unit may be a desiccant-based system. For example, the moisture removal unit may include a chamber with desiccant bed and an area through which vaporized or gas refrigerant may be conveyed such that it comes in contact with the desiccant in the bed. A general scheme of a moisture removal unit is shown in FIG. 2. In FIG. 2, the refrigerant (denoted by arrows) may enter the moisture removal unit 11a through a conduit 15a, pass through voids 23 between solid desiccant particles 25 within the desiccant bed 21, and then exit the moisture removal unit 11a through conduit 13a. The moisture removal unit may include additional components not shown in FIG. 2, for example, filters, screens, inert packing material, and any material or structure that provides support to the desiccant bed.

The moisture removal unit may allow cycling of refrigerant to pass through the desiccant bed multiple times. After a desired number of cycles and a desired level of dehydration of refrigerant, refrigerant may be fed into the refrigeration circuit.

The desiccant may be any well-known hygroscopic material. A number of suitable desiccants are used and well known in the art, for example, silica, activated charcoal, calcium sulfate (gypsum), calcium chloride, molecular sieves, and combinations thereof. The desiccant bed may be a loose bed or packed bed.

Desiccant may be regenerated for continued or recycled use or the desiccant may be used, discarded, and replaced with fresh desiccant. Regeneration of desiccant may be carried out by methods well known in the art, for example, by drying the desiccant in an oven.

In any embodiment, the moisture removal unit may be a permanent fixture in the fluid flow path originating at the refrigerant source feeding into the refrigeration circuit. Alternatively, a moisture removal unit may be removable such that at a desired time, the moisture removal unit may be attached downstream of the refrigerant source and upstream of the refrigeration circuit and appropriate valves are manipulated to direct refrigerant to the moisture removal unit. For example, the moisture removal unit may be mounted on a movable platform, for example, a trailer that may be towed by a vehicle. After a desired cycle time, the moisture removal unit may be removed for use in a different refrigeration circuit or different LNG train. Alternatively, the moisture removal unit may be a facility moisture removal unit and at a desired time, refrigerant may be directed through piping to the facility moisture removal unit.

Figure 3:
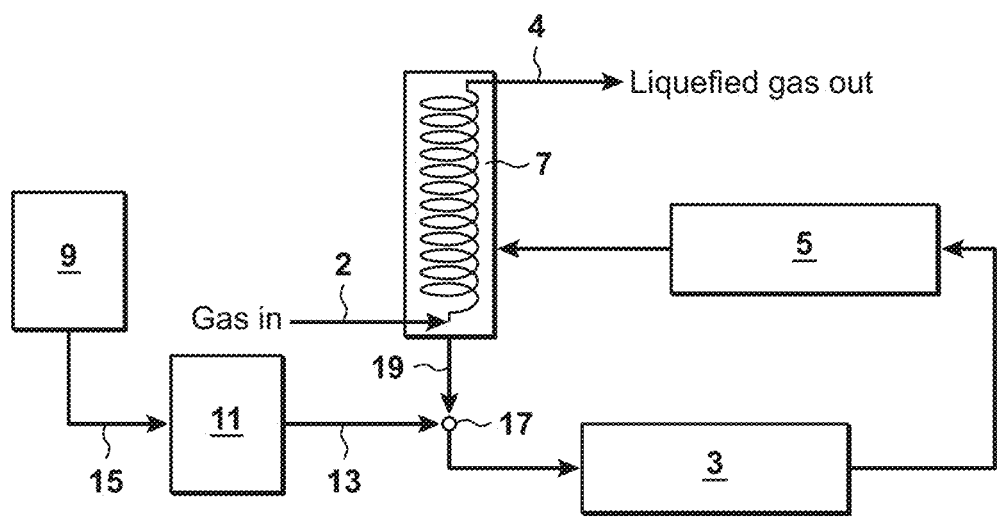
FIG. 3 illustrates a nonlimiting example of a refrigeration circuit incorporating a moisture removal unit showing how the refrigeration circuit interrelates to the gas stream being liquefied.

In another method, the present disclosure provides a method for liquefying a gas stream using a system incorporating a moisture removal unit, for example, as shown in FIG. 3. The method may include the steps of:
a) providing the gas stream;
b) providing refrigerant;
c) conveying refrigerant through a moisture removal unit to form dehydrated refrigerant;
d) compressing the dehydrated refrigerant to provide compressed dehydrated refrigerant;
e) cooling and condensing the compressed dehydrated refrigerant to provide cooled refrigerant;
f) conveying the cooled dehydrated refrigerant to a heat exchanger; and
g) passing the gas stream through the heat exchanger to cool at least part of the gas stream by indirect heat exchange with the dehydrated cooled refrigerant.

In FIG. 3, all numbered elements are identical as were identified in FIG. 1. Additionally, the flow of the gas stream is depicted entering and exiting the heat exchanger 7. The gas stream, e.g., natural gas, enters the heat exchanger 7 by way of conduit 2 where cooled condensed refrigerant absorbs energy from the natural gas, liquefying the gas. The liquefied gas then exits the heat exchanger 7 by way of conduit 4. The gas stream may be rich in methane, for example, natural gas. Natural gas contains, as its primary component (e.g., greater than 87 mole percent), methane, but may have other components such as ethane, propane, isobutene, n-butane, isopentane, n-pentane, hexanes, nitrogen, carbon dioxide, hydrogen, oxygen, sulfur, water, or any combination thereof. As noted above, refrigerant may be any type of refrigerant or mixtures of refrigerants, for example, methane, nitrogen, ethane, ethylene, propane, other commercial refrigerant compounds, or combinations thereof. Refrigerant may be a single component or mixed component and conveyed through the moisture removal unit to remove at least a portion of water from the refrigerant. Mixed refrigerants may pass through the moisture removal unit as a mixture or as single components that are mixed after the moisture removal unit and before being fed into the refrigeration circuit. The moisture removal unit may allow cycling of refrigerant to pass through the desiccant bed multiple times. After a desired number of cycles and a desired level of dehydration of refrigerant, refrigerant may be fed into the refrigeration circuit. After entry into the refrigeration circuit, dehydrated refrigerant may be compressed. The dehydrated refrigerant may then be conveyed to a condenser that liquefies and cools the dehydrated refrigerant. The cooled dehydrated refrigerant may then be conveyed to a heat exchanger such that energy from a gas stream, which is concurrently being conveyed through a different portion of the heat exchanger, is transferred to the cooled dehydrated refrigerant, resulting in liquefaction of the gas stream.

As noted above, the moisture removal unit may be a desiccant-based system, e.g., having a chamber with a desiccant bed through which the refrigerant passes. The desiccant may be any well-known hygroscopic material, as listed above.

In any embodiment described herein, refrigerant downstream of the moisture removal unit will have a lower water content that the refrigerant upstream of the moisture removal unit. The efficiency of dehydration may depend on a variety of factors, including initial water content, amount of desiccant, type of desiccant, physical properties of the desiccant (such as surface area, size, shape), and the amount of time the refrigerant spent in the moisture removal unit. Refrigerant may cycle through the moisture removal unit more than one time.

Using the methods disclosed herein and by removing moisture from source refrigerant, the frequency of water pooling in refrigeration circuit component (e.g., heat exchangers) may be reduced compared to frequency of pooling when no moisture removal unit is utilized. It is contemplated that conventional "de-frosting" processes may not be necessary or may be performed less frequently by implementation of one of the many embodiments of a moisture removal unit within the refrigeration circuit as disclosed and described herein. By using the methods and systems disclosed herein, the time required between de-frosting may be increased when compared to a method that does not use moisture removal units. It is contemplated that in some instances, de-frosting may not be required at all to maintain standard and continued operation of the refrigeration circuit for cryogenic processing.

EXAMPLE EMBODIMENTS

A nonlimiting example embodiment is a system for removing moisture from refrigerant for use in a LNG refrigeration circuit comprising: a refrigerant source; a moisture removal unit containing desiccant; a refrigeration circuit comprising a refrigerant compressor, a refrigerant condenser, and a heat exchanger that are fluidly connected in a loop where the refrigerant compressor is upstream of the refrigerant condenser, the refrigerant condenser is upstream of the heat exchanger, and the heat exchanger is upstream of the refrigerant compressor; and wherein the refrigerant source is fluidly coupled to the moisture removal unit to supply a refrigerant from the refrigerant source to the moisture removal unit, and the moisture removal unit is fluidly coupled to the refrigeration circuit to supply the refrigerant from the moisture removal unit to the refrigeration circuit. Optionally, the embodiment can include one or more of the following: Element 1: wherein the moisture removal unit is fluidly coupled to the refrigeration circuit downstream of the heat exchanger; Element 2: wherein the moisture removal unit is removably attached to the refrigeration circuit; Element 3: wherein the refrigerant is a mixed refrigerant; Element 4: Element 3 and wherein the refrigerant is a mixture comprising two or more components selected from the group consisting of methane, nitrogen, ethane, ethylene, and propane; Element 5: wherein the refrigerant is a single component refrigerant selected from the group consisting of methane, nitrogen, propane, and ethylene; and Element 6: wherein the desiccant is selected from the group consisting of silica, activated charcoal, calcium sulfate, calcium chloride, molecular sieves, and combinations thereof. Examples of combinations include, but are not limited to, Element 1 in combination with Element 2 and optionally in further combination with Element 6; Element 1 in combination with Element 6; Element 2 in combination with Element 6; and Element 3 (and optionally Element 4) or Element 5 in combination with one or more of Elements 1, 2, and 6.

Another nonlimiting example embodiment is a method for supplying dehydrated refrigerant to a LNG refrigeration circuit comprising the steps of: fluidly connecting a refrigerant source to and upstream from a moisture removal unit containing a desiccant; fluidly connecting the moisture removal unit to and upstream of the refrigeration circuit; and conveying a refrigerant from the refrigerant source through the moisture removal unit to the refrigeration circuit. Optionally, the embodiment can include one or more of the following: Element 2; Element 3; Element 4; Element 5; Element 6; and Element 7: wherein the refrigeration circuit is at ambient temperature when refrigerant is conveyed from the refrigerant source through the moisture removal unit to the refrigeration circuit. Examples of combinations include, but are not limited to, Element 7 in combination with Element 2 and optionally in further combination with Element 6; Element 7 in combination with Element 6; Element 2 in combination with Element 6; and Element 3 (and optionally Element 4) or Element 5 in combination with one or more of Elements 2, 6, and 7.

Yet another nonlimiting example embodiment is a method comprising: conveying a refrigerant through a moisture removal unit to form a dehydrated refrigerant; compressing the dehydrated refrigerant to provide a compressed dehydrated refrigerant; cooling and condensing the compressed dehydrated refrigerant to provide a cooled dehydrated refrigerant; conveying the cooled dehydrated refrigerant through a heat exchanger; and passing a gaseous natural gas stream through the heat exchanger to cool at least part of the gaseous natural gas stream to a liquefied natural gas (LNG) by indirect heat exchange with the dehydrated cooled refrigerant. Optionally, the embodiment can include one or more of the following: Element 2; Element 3; Element 4; Element 5; Element 6; and Element 8: wherein the LNG stream comprises 87 percent by mole to 97 percent by mole methane. Examples of combinations include, but are not limited to, Element 8 in combination with Element 2 and optionally in further combination with Element 6; Element 8 in combination with Element 6; Element 2 in combination with Element 6; and Element 3 (and optionally Element 4) or Element 5 in combination with one or more of Elements 2, 6, and 8.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related, and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A system comprising:
    a refrigerant source;
    a moisture removal unit containing desiccant;
    a refrigeration circuit comprising a refrigerant compressor, a refrigerant condenser, and a heat exchanger that are fluidly connected in a loop where the refrigerant compressor is upstream of the refrigerant condenser, the refrigerant condenser is upstream of the heat exchanger, and the heat exchanger is upstream of the refrigerant compressor and fluidly coupled with a valve between the heat exchanger and the refrigerant compressor; and
    wherein the refrigerant source is fluidly coupled to the moisture removal unit to supply a refrigerant from the refrigerant source to the moisture removal unit, and the moisture removal unit is fluidly coupled to the refrigeration circuit with the valve also between the moisture removal unit and the refrigeration circuit capable of slowing flow in the refrigeration circuit to supply the refrigerant from the moisture removal unit to the refrigeration circuit.

2. The system of claim 1, wherein the moisture removal unit is fluidly coupled to the refrigeration circuit downstream of the heat exchanger.

3. The system of claim 1, wherein the moisture removal unit is removably attached to the refrigeration circuit.

4. The system of claim 1, wherein the refrigerant is a mixed refrigerant.

5. The system of claim 4, wherein the refrigerant is a mixture comprising two or more components selected from the group consisting of methane, nitrogen, ethane, ethylene, and propane.

6. The system of claim 1, wherein the refrigerant is a single component refrigerant selected from the group consisting of methane, nitrogen, propane, and ethylene.

7. The system of claim 1, wherein the desiccant is selected from the group consisting of silica, activated charcoal, calcium sulfate, calcium chloride, molecular sieves, and combinations thereof.

8. A method comprising:
    fluidly connecting a refrigerant source to and upstream from a moisture removal unit containing a desiccant; and
    fluidly connecting the moisture removal unit to and upstream of a refrigeration circuit with a valve between the moisture removal unit and the refrigeration circuit capable of slowing flow in the refrigeration circuit; and
    conveying a refrigerant from the refrigerant source through the moisture removal unit to the refrigeration circuit.

9. The method of claim 8, wherein the refrigeration circuit is at ambient temperature when refrigerant is conveyed from the refrigerant source through the moisture removal unit to the refrigeration circuit.

10. The method of claim 8, wherein the moisture removal unit is removably attached to the refrigeration circuit.

11. The method of claim 8, wherein the desiccant is selected from the group consisting of silica, activated charcoal, calcium sulfate, calcium chloride, molecular sieves, and combinations thereof.

12. The method of claim 8, wherein the refrigerant is a mixed refrigerant.

13. The method of claim 12, wherein the refrigerant is a mixture comprising two or more components selected from the group consisting of methane, nitrogen, ethane, ethylene, and propane.

14. The method of claim 8, wherein the refrigerant is a single component refrigerant selected from the group consisting of methane, nitrogen, propane, and ethylene.

15. A method comprising:
conveying a refrigerant through a moisture removal unit to form a dehydrated refrigerant;
compressing the dehydrated refrigerant to provide a compressed dehydrated refrigerant;
cooling and condensing the compressed dehydrated refrigerant to provide a cooled dehydrated refrigerant;
conveying the cooled dehydrated refrigerant through a heat exchanger;
passing a gaseous natural gas stream through the heat exchanger to cool at least part of the gaseous natural gas stream to a liquefied natural gas (LNG) by indirect heat exchange with the dehydrated cooled refrigerant, creating a used dehydrated refrigerant;
repeating the process, starting by compressing the used dehydrated refrigerant; and
wherein if there is not enough used dehydrated refrigerant to repeat the process, a valve interrupts a flow of the used dehydrated refrigerant to add additional dehydrated refrigerant to the flow of the used dehydrated refrigerant.

16. The method of claim 15, wherein the moisture removal unit comprises a desiccant selected from the group consisting of silica, activated charcoal, calcium sulfate, calcium chloride, molecular sieves, and combinations thereof.

17. The method of claim 15, wherein the gaseous natural gas stream comprises 87 percent by mole to 97 percent by mole methane.

18. The method of claim 15, wherein the refrigerant is a mixed refrigerant.

19. The method of claim 18, wherein the refrigerant is a mixture comprising two or more components selected from the group consisting of methane, nitrogen, ethane, ethylene, and propane.

20. The method of claim 15, wherein the refrigerant is a single component refrigerant selected from the group consisting of methane, nitrogen, propane, and ethylene.

* * * * *